United States Patent [19]

Jambhekar

[11] Patent Number: 5,692,046
[45] Date of Patent: Nov. 25, 1997

[54] FOLDABLE TELEPHONE HANDSET HAVING TRANSFORMABLE HINGE

[75] Inventor: Shrirang N. Jambhekar, Schaumburg, Ill.

[73] Assignee: Motorola, Inc., Schaumburg, Ill.

[21] Appl. No.: 553,207

[22] Filed: Nov. 7, 1995

[51] Int. Cl.⁶ .................................. H04M 1/00; H04B 1/38
[52] U.S. Cl. .......................... 379/433; 379/434; 379/428; 455/90
[58] Field of Search .................... 379/446, 455, 379/426, 428, 452, 437; 455/89, 90

[56] References Cited

U.S. PATENT DOCUMENTS

| | | | |
|---|---|---|---|
| 3,476,886 | 11/1969 | Ferrari et al. | 379/362 |
| 4,018,998 | 4/1977 | Wegner | 379/370 |
| 4,446,333 | 5/1984 | Kessler | 379/444 |
| 4,684,017 | 8/1987 | Watanabe et al. | 206/235 |
| 4,840,288 | 6/1989 | Lunderman et al. | 220/334 |
| 5,189,632 | 2/1993 | Paajanen et al. | 364/705.05 |
| 5,221,838 | 6/1993 | Gutman et al. | 235/379 |
| 5,325,984 | 7/1994 | Ady et al. | 220/342 |
| 5,335,273 | 8/1994 | Takagi et al. | 379/433 |
| 5,348,347 | 9/1994 | Shink | 281/31 |
| 5,436,969 | 7/1995 | Kobayashi | 379/433 |
| 5,465,401 | 11/1995 | Thompson | 455/89 |
| 5,535,439 | 7/1996 | Katz | 455/117 |

FOREIGN PATENT DOCUMENTS 3-162023  7/1991  Japan ........................ H04B 7/26

*Primary Examiner*—Krista M. Zele
*Assistant Examiner*—Taunya A. McCarty
*Attorney, Agent, or Firm*—Daniel W. Juffernbruch

[57] ABSTRACT

A transformable hinge (130) foldably connects two substrates (110, 120) at curved mating edges (140, 150). The transformable hinge (130) is capable of folding between a closed position for storage and an open position for use. In the open position, the transformable hinge (130) exhibits a configuration which orients an audio transducer (320) for communication of sound with the user's head when in the open position. Radiotelephone circuitry can be part of one substrate (110) and accessories can be received by the other of the substrates (120).

16 Claims, 6 Drawing Sheets

FOLDABLE TELEPHONE HANDSET HAVING TRANSFORMABLE HINGE

BACKGROUND OF THE INVENTION

1. Technical Field of the Invention

The present invention relates to telephone handsets and, more particularly, relates to foldable telephone handsets for portable radiotelephones.

2. Description of the Related Art

Telephone handsets that fold in the middle have been proposed. These telephone handsets fold with an earpiece in an upper portion and a mouthpiece in a lower portion. A hinge is disposed between the portion of the mouthpiece and the portion of the earpiece. The folding serves to provide a more compact package when stored and also to protect the faces of the portions when stored.

Telephones having flaps or covers hinged at the bottom of a front surface have also been used. The cover when in the open position, serves to align the handset for a better ear-to-mouth relationship. Although initially the mouthpiece was placed in the flap or cover, it was found that a small microphone could be disposed elsewhere on the body of the telephone near the hinge, and the hinged cover still used to encourage a better ear-to-mouth relationship fit to a user's head.

New and different foldable telephone handsets are desired. Improvements are needed for greater flexibility for accessories and customization of the telephone for a particular user's needs and style. A telephone handset having a different and more compact configuration while still maintaining a good ear-to-mouth relationship is also desired.

The present invention solves these and other problems by providing the following and other features which will become more apparent from the following detailed description when read in conjunction with the accompanying drawings.

SUMMARY OF THE INVENTION

The present invention provides a foldable telephone handset having a transformable hinge which foldably connects two substrates. The transformable hinge is capable of folding between a closed position for storage and an open position for use. The transformable hinge has an earpiece coupled to an audio transducer which, in the open position, exhibits a configuration which orients the earpiece with the user's head for communication of sound. Radiotelephone circuitry can be part of one substrate and accessories can be received by the other substrate.

These and other features of the present invention will be described below with reference to the accompanying drawings.

DETAILED DESCRIPTION OF THE PREFERRED EMBODIMENTS

Figure 1:
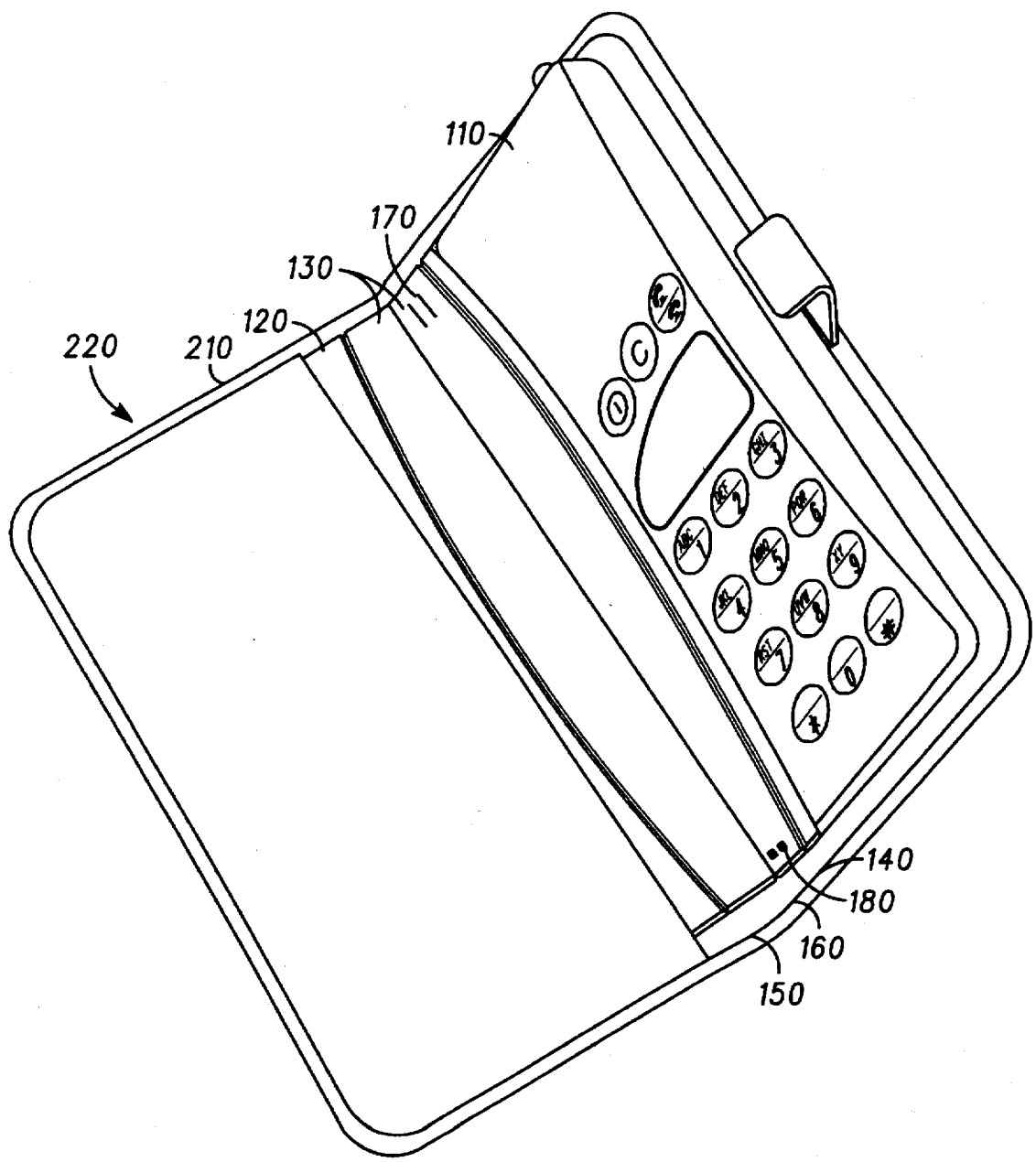
FIG. 1 illustrates a foldable telephone handset and carrying case in an intermediate position between an open position and a closed position.

Substrates 110 and 120 and transformable hinge 130 are hinged at curved mating edges 140 and 150 as illustrated in FIG. 1. An elongated straight fold 160 at a center portion of the transformable hinge 130 allows the telephone handset to be stored flat. When the telephone handset is stored flat, it has a small thickness in profile. The small thickness allows the telephone handset to be easily placed in a user's breast pocket or purse.

An earpiece 170 and a mouthpiece 180 are preferably located at respective top and bottom ends of the transformable hinge 130. The substrate 110 preferably has a radiotelephone transceiver with battery, keypad, display and antenna as will be explained further below. The other substrate 120 in the illustrated embodiment of FIG. 1 forms a flap. The flap of the other substrate 120 can be slid into a pocket 210 of a carrying case 220. The carrying case 220 can be a typical folding checkbook-type cover. Different carrying cases made of different materials, e.g., plastic or leather, different textures, e.g., matte, grooved or alligator, and different colors, e.g., black, gray, brown and red, can be easily accommodated. The user can thus easily personalize his or her telephone handset's appearance by changing the case 220.

When folding towards a closed position, the transformable hinge 130 flexes along the elongated straight fold 160. Similarly, when the telephone handset folds towards an open position, the transformable hinge 130 flexes along the edges 140 and 150.

Figure 2:
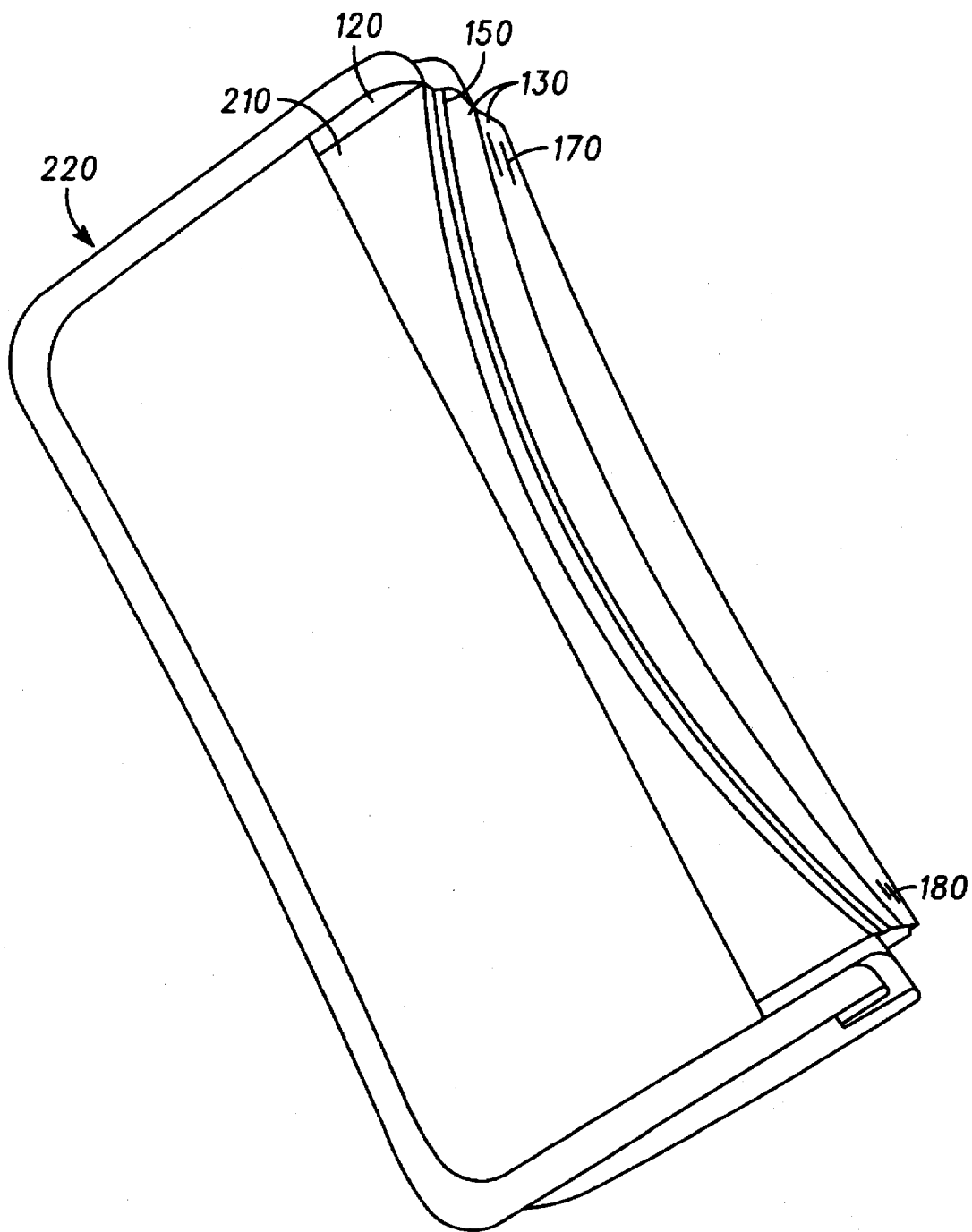
FIG. 2 illustrates a foldable telephone handset and carrying case in an open position.

FIG. 2 illustrates the foldable telephone handset in an open position with flap portion of substrate 120 inserted in pocket 210 of case 220. The transformable hinge 130 is folded about the curved edge 150. The hinge 130 thus transforms its shape in the open position to provide for a correct ear-to-mouth relationship when placed at a user's head. The banana-like shape resulting from the transformation of the hinge 130 allows the earpiece 170 at the top, and the mouthpiece 180 at the bottom, to be held close to a user's ear and mouth while avoiding collision with a user's cheek.

Figure 3:
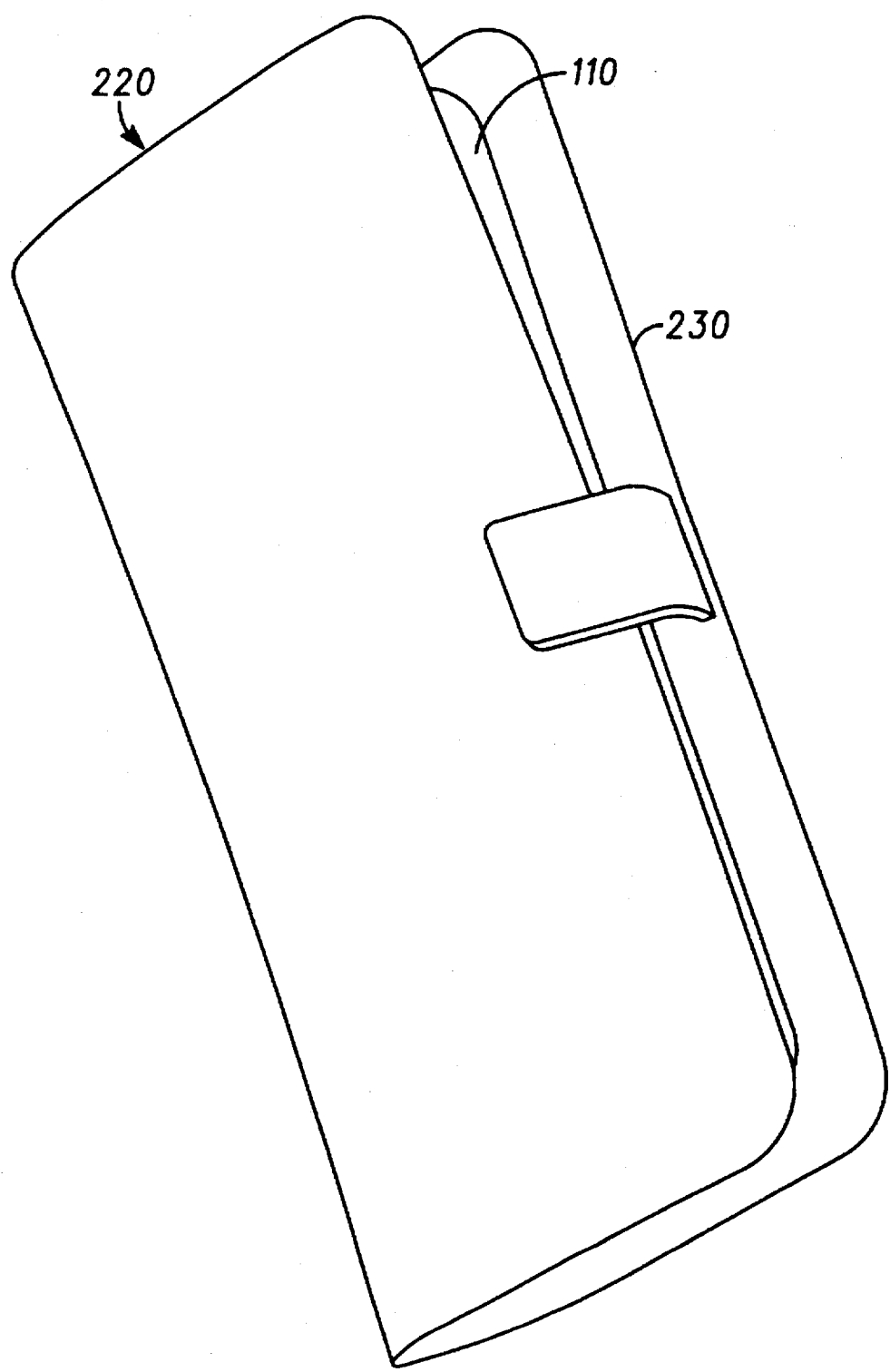
FIG. 3 illustrates a foldable telephone handset and carrying case in a closed position.

FIG. 3 illustrates the foldable telephone handset with carrying case in a closed position. The carrying case 220 preferably has a strap 230 of the VELCRO type for holding the carrying case 220 in the closed position with substrates 110 and 120 therebetween. The strap 230 helps keep the substrates 110 and 120 together in the closed position. The strap 230 can be of other types such as latches and snaps or can be eliminated altogether. A snap could also be used to lock the substrates together also in the open position.

Figure 4:
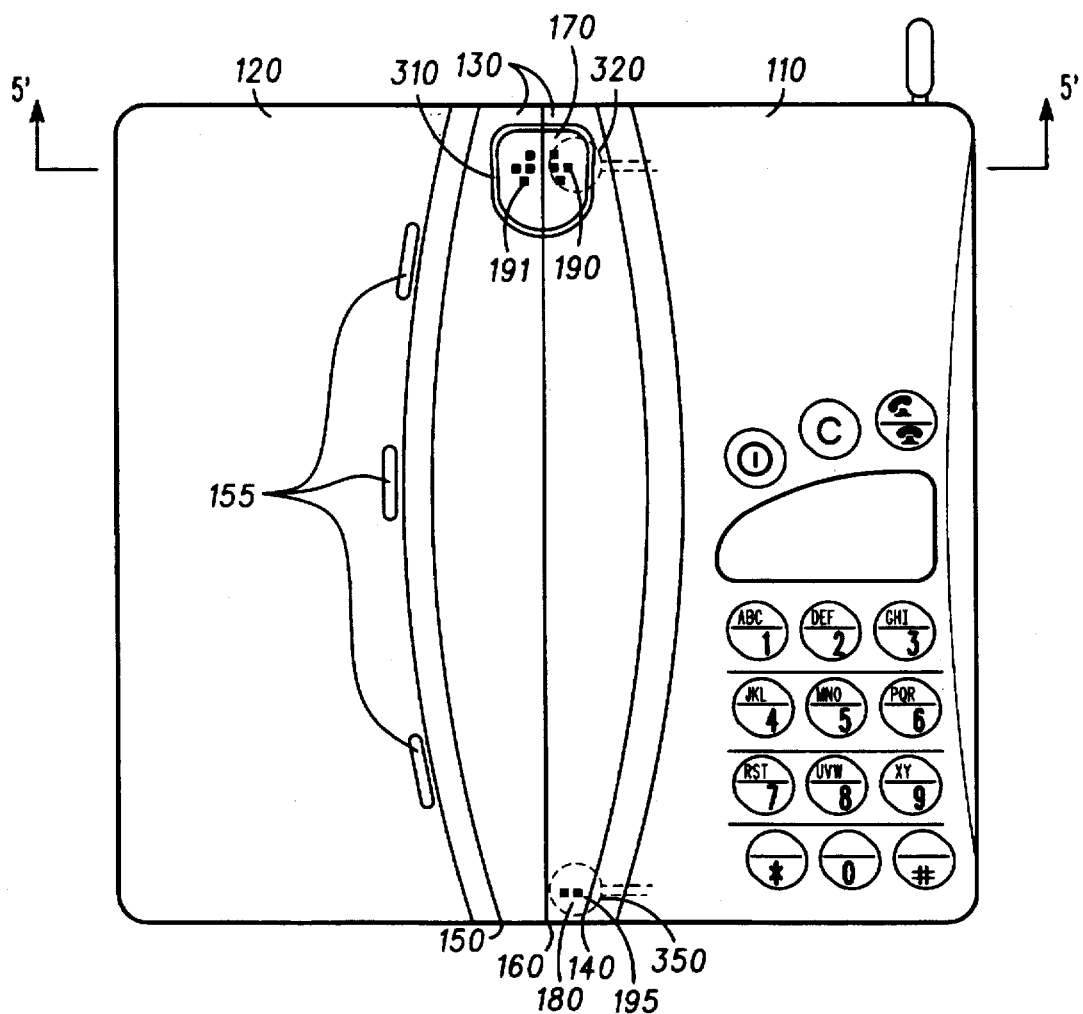
FIG. 4 illustrates a plan view of the front of a foldable telephone handset according to a first embodiment.
Figure 5:
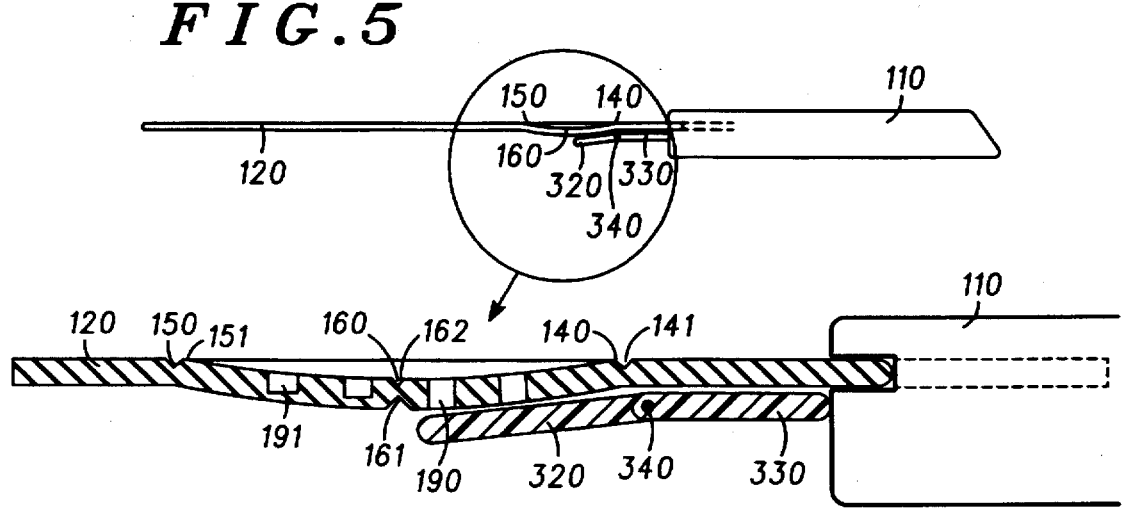
FIG. 5 illustrates a cross-section of the foldable telephone handset of FIG. 4.

FIGS. 4 and 5 illustrate a foldable telephone handset according to a first embodiment of the present invention. The earpiece 170 of transformable hinge 130 preferably contains an ear cup 310. The ear cup 310 is formed by a depression forming a cavity in the material of the transformable hinge 130. The ear cup 310 is preferably formed by molding of the material forming the transformable hinge 130 and mating edges of the substrates 110 and 120. Holes 190 are preferably punched through the material of the transformable hinge 130. Some holes 191 can be placebo holes for appearance, and other holes 190 can be real for sound to pass therethrough from a speaker.

A speaker 320 is preferably disposed behind holes 190 on one side of the fold 160 of the transformable hinge 130. The speaker 320 is preferably a miniature audio transducer connected to radiotelephone circuitry of the substrate 110. The speaker 320 is preferably connected to the radiotelephone circuitry of the substrate 110 by a connection strip 330 and a hinge 340. The speaker 320 and connection strip 330 preferable are rigid members cantilevered from the edge of the radiotelephone circuitry of the substrate 110. The hinge 340 is biased with a spring force toward the transformable hinge 130. The speaker 320 and connection strip 330 can alternatively be glued to the back side of the transformable hinge 130 and the substrate 110. The speaker 320 and connection strip 330 can instead be glued into a recess of the transformable hinge 130 and substrate 110 or sandwiched between layers of the transformable hinge 130 and substrate 110.

The mouthpiece 180 also has holes 195. The holes 195 are preferably through-holes in the portion of the transformable hinge 130 on the side of the fold 160 nearest the substrate 110. A microphone 350 is disposed at holes 195 as discussed above with respect to the speaker 320.

The curved mating edges 140 and 150 and the fold 160 each preferably have grooves 141, 151, 161 and 162 formed therein to encourage folding along a fold line. The grooves 141 and 151 for the mating edges 140 and 150 preferably face towards the earpiece and mouthpiece 180. The fold 160 preferably has an inner groove 162 and an outer groove 161 facing in opposite directions. The inner groove 162 is preferably shallower than the outer groove 161 and urges the transformable hinge 130 into the banana-like shape when in the open position. These grooves help urge the mating edges 140 and 150 and fold 160 in the desired directions when the substrates are folded throughout almost 360 degrees to move about almost a full circle. The transformable hinge 130 and mating edges of the substrates 110 and 120 are preferably made of a rigid rubberized but flexible material such as the LOMOD, grade ST3090A material, lot number CAF193 made available from General Electric, having high flexural strength. A thickness of 0.3173 cm (0.125 inches) is preferred.

Elongated holes 155 can be placed near the mating edge 150. Besides aiding in flexibility, the elongated holes 155 can be used for attaching accessories and other devices to the substrate 120 as will be described below.

Figure 6:
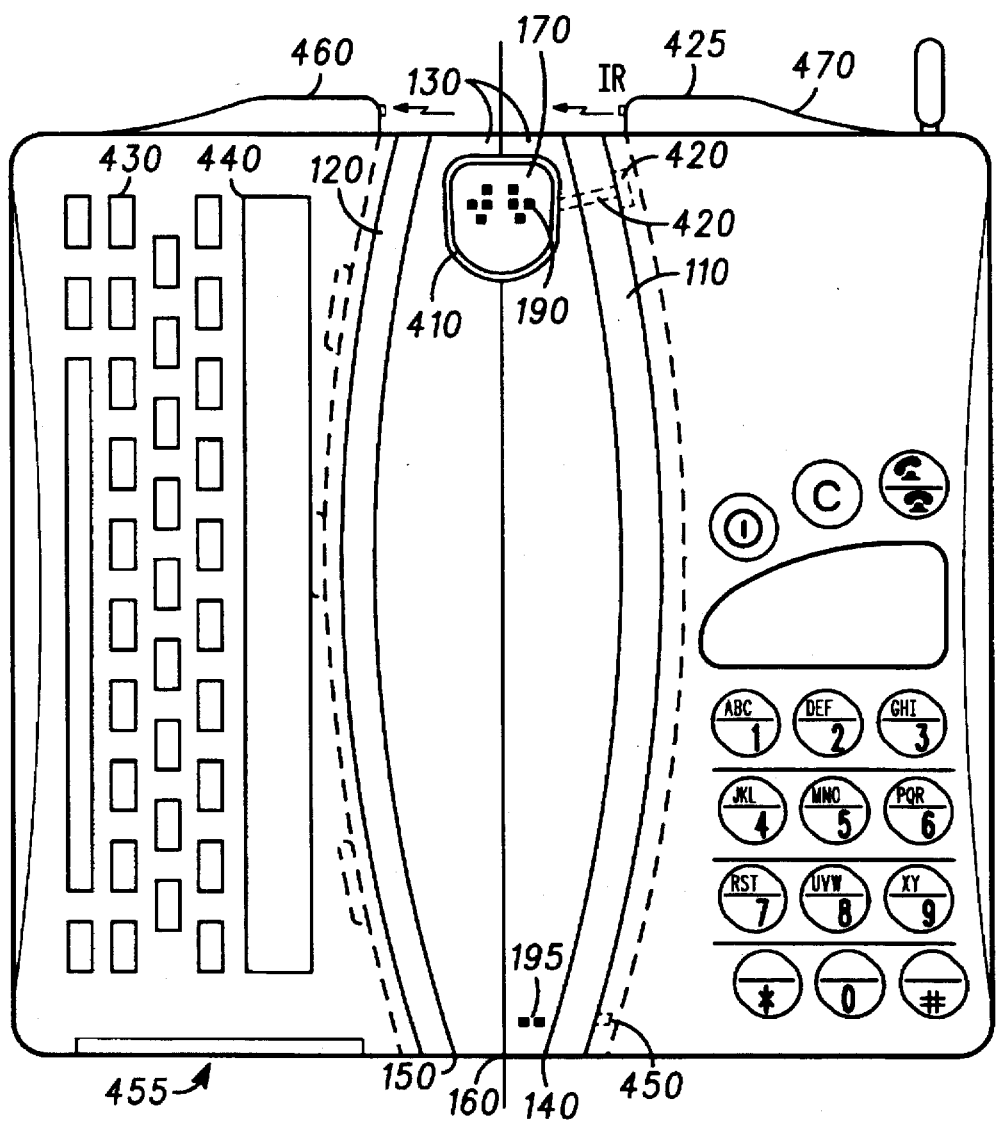
FIG. 6 illustrates a plan view of the front of a foldable telephone handset according to a second embodiment.

FIG. 6 illustrates a foldable telephone handset according to a second embodiment of the invention. A speaker 420 is provided on an edge of the radiotelephone circuitry rather than in or behind the transformable hinge 130. Sound from the speaker 420 is ported to an ear cup 410 through an acoustic channel 425. The acoustic channel 420 is formed in an edge portion of the substrate 110 and formed in the transformable hinge 130. The acoustic channel 425 can be formed by drilling or by laminating two grooved layers for best audio performance, the porting of the speaker 420 to the ear cup 410 is desired for best audio performance. Nevertheless, porting of a microphone 450 is not as important. Therefore, placebo holes 195 are provided for a mouthpiece in the transformable hinge 130. Sound is instead directed from a user's mouth to a microphone 450 on an edge of radiotelephone circuitry in the substrate 110.

Besides radiotelephone circuitry for the substrate 110, other types of circuitry can be used with the substrate 120. The second embodiment of FIG. 6 illustrates a full keypad 430 and display 440 as part of the second substrate 120. A slot 455 for accepting a smart card, a data card or a PCMCIA (Personal Computer Memory Card International Association) card. The substrate 120 can be adapted to selectively receive optional accessories such as the full keypad 430, the large display 440 or the card slot 455. These optional accessories can be secured to the substrate 120 forming a part thereof. Although the full keypad 430, display 440 and slot 455 can be used together, different combinations thereof can be provided to suit a particular user's needs and requirements.

The optional accessories 120 can communicate with circuitry of the other substrate 110 via infra-red optical transducers 460 and 470. The optical infra-red transducers 460 and 470 are preferably located above or below the transformable hinge 130 to allow optical transmission when the hinge is in a full open position and also in an intermediate partially, but not fully, closed position.

Figure 7:
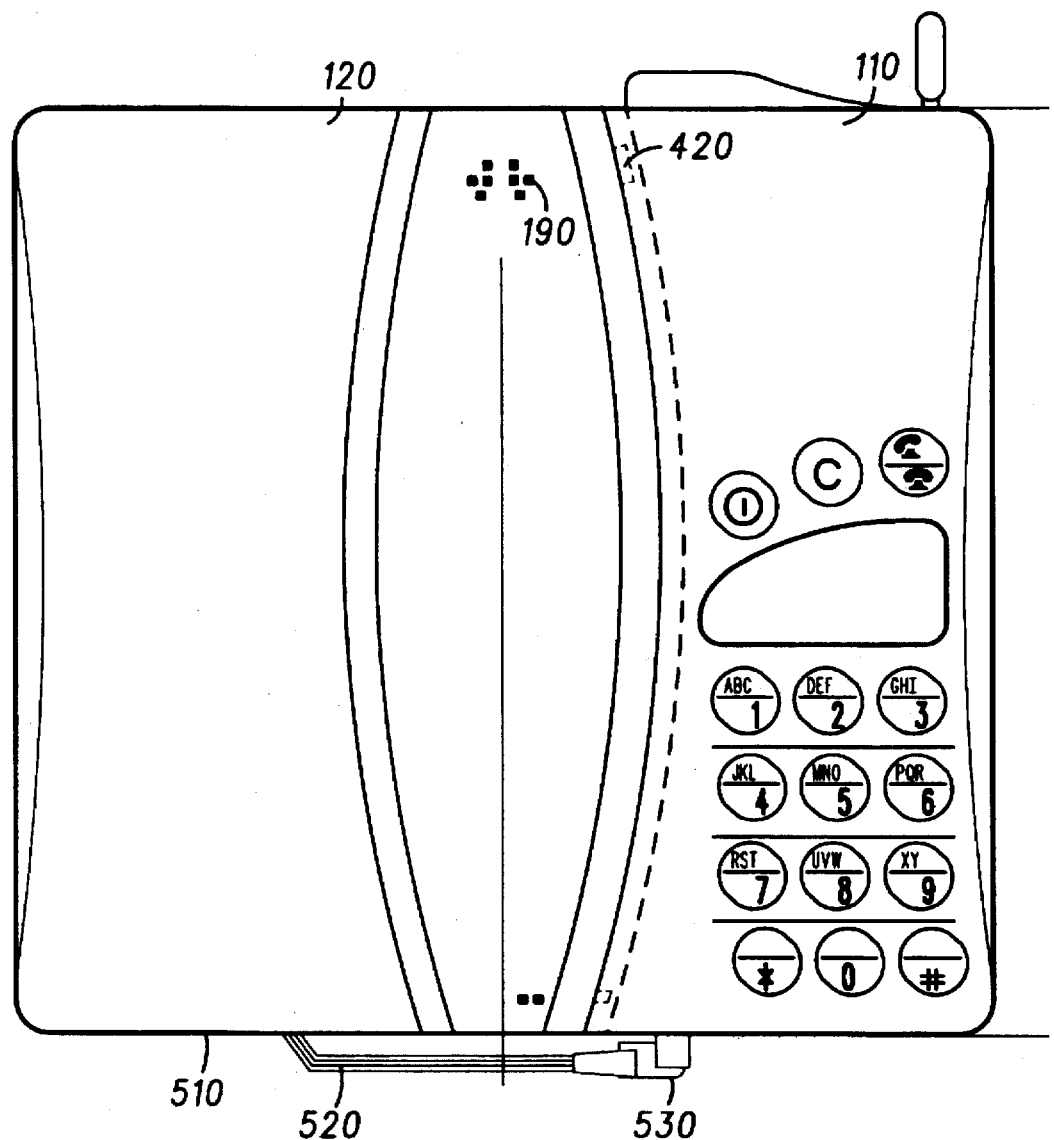
FIG. 7 illustrates a plan view of the front of a foldable telephone handset according to a third embodiment.

FIG. 7 illustrates a foldable telephone handset according to a third embodiment. A speaker 420 can be provided on an edge or radiotelephone circuitry of the substrate 110 depending upon the audio characteristics of the speaker 420. An ear cup is thus unnecessary near the holes 190. The holes 190 are thus placebo holes and the earpiece is instead formed by the speaker 420 on the edge of the radiotelephone circuitry of the substrate 110. Another example of an accessory connectable to the substrate 120 is a detachable, rechargeable battery. The battery 510 preferably connects to the radiotelephone circuitry of the substrate 110 using a cable 520 and a connector 530.

Although the invention has been described and illustrated in the above description and drawings, it is understood that this description is by example only and that numerous changes and modifications can be made by those skilled in the art without departing from the true spirit and scope of the invention.

What is claimed is:

1. A foldable telephone handset for storage in a closed position and for holding to a user's head in an open position, said foldable telephone handset comprising:

first and second substrates, each of the substrates comprising a hinged edge;

a transformable hinge foldably connected between the first and second substrates at the hinged edges of the first and second substrates, said transformable hinge capable of folding the first and second substrates almost 360 degrees between the closed position and the open position;

an earpiece located in the transformable hinge for orientation with the user's head when in the open position; and an audio transducer operatively ported to the earpiece of the transformable hinge.

2. A foldable telephone handset according to claim 1, wherein the hinged edges of said substrates are inwardly curved; and wherein mating edges of said transformable hinge are correspondingly outwardly curved to allow the telephone handset to conform to the user's head when in an open position.

3. A foldable telephone handset according to claim 1, wherein said transformable hinge has an elongated straight fold at a center portion thereof to allow the telephone handset to be stored flat when in a closed position.

4. A foldable telephone handset according to claim 1, wherein said transformable hinge and said at least two substrates are made from a rigid but flexible material having a groove formed therein to encourage folding along a fold line.

5. A foldable telephone handset according to claim 1, wherein said earpiece of the transformable hinge comprises a depression forming an ear cup.

6. A foldable telephone handset according to claim 1, wherein one of said substrates comprises a mouthpiece near the hinged edge.

7. A foldable telephone handset according to claim 6, wherein said one of the substrates comprises said audio transducer near the hinged edge thereof.

8. A foldable telephone handset according to claim 1, wherein one of said substrates comprises radiotelephone circuitry.

9. A foldable telephone handset according to claim 8, wherein at least another of said substrates receives optional accessories comprising a smart card, a data card, a PCMCIA card, an accessory keypad, or a battery.

10. A foldable telephone handset according to claim 1,
wherein at least two of said substrates comprise electric circuitry; and
wherein said electric circuitry comprise infra-red transducers for links therebetween.

11. A foldable telephone handset according to claim 1, further comprising a case removably associated with at least one of the substrates.

12. A foldable telephone handset according to claim 1,
wherein the inwardly curved hinged edges of said first and second substrates have convex curves; and
wherein the outwardly curved mating edges of said transformable hinge have concave curves corresponding therewith.

13. A foldable telephone handset for storage in a closed position and for holding to a user's head in an open position, said foldable telephone handset comprising:
at least two substrates, each of the substrates comprising a hinged edge;
a transformable hinge foldably connected between the hinged edges of the substrates, said transformable hinge capable of folding the substrates almost 360 degrees between the closed position and the open position; and
an audio transducer located in the transformable hinge or near at least one of the hinged edges for orientation with the user's head when in the open position,
wherein the hinged edges of said substrates are inwardly curved; and
wherein mating edges of said transformable hinge are correspondingly outwardly curved to allow the telephone handset to conform to the user's head when in an open position.

14. A foldable telephone handset according to claim 13, wherein said transformable hinge has an elongated straight fold at a center portion thereof to allow the telephone handset to be stored flat when in a closed position.

15. A foldable telephone handset according to claim 13,
wherein the inwardly curved hinged edges of said substrates have convex curves; and
wherein the outwardly curved mating edges of said transformable hinge have concave curves corresponding therewith.

16. A foldable telephone handset for storage in a closed position and for holding to a user's head in an open position, said foldable telephone handset comprising:
at least two substrates, each of the substrates comprising an inwardly curved hinged edge;
a transformable hinge foldably connected between the inwardly hinged edges of the substrates at corresponding outwardly curved mating edges of the transformable hinge to conform to the user's head when in an open position, and foldable at an elongated straight fold at a center portion of the transformable hinge to be stored flat when in a closed position, said transformable hinge capable of folding the substrates almost 360 degrees between the closed position and the open position and transforming its shape between the open and closed positions, said transformable hinge comprising a depression forming an ear cup;
an earpiece coupled to the ear cup and located in the transformable hinge or near at least one of the hinged edges at a top end for orientation with the user's head when in the open position; and
a mouthpiece located in the transformable hinge or near at least one of the hinged edges at a bottom end for orientation with the user's head when in the open position.

* * * * *